United States Patent [19]

Mink

[11] 4,450,242

[45] May 22, 1984

[54] CATALYST FOR POLYMERIZING OLEFINS

[75] Inventor: Robert I. Mink, Yonkers, N.Y.

[73] Assignee: Stauffer Chemical Company, Westport, Conn.

[21] Appl. No.: 405,977

[22] Filed: Aug. 9, 1982

[51] Int. Cl.³ .............................................. C08F 4/64
[52] U.S. Cl. .................................... 502/105; 502/113; 502/125; 502/127; 502/126; 502/123; 502/124; 502/121; 502/122; 526/114; 526/128; 526/125
[58] Field of Search ...................................... 252/429 B

[56] References Cited

U.S. PATENT DOCUMENTS

| 3,135,809 | 6/1964 | Bosmajian | 252/429 A X |
| 3,412,174 | 11/1968 | Kroll | 252/429 B X |
| 4,143,223 | 3/1979 | Toyota et al. | 252/429 B X |
| 4,157,435 | 6/1979 | Toyota et al. | 252/429 B X |
| 4,312,782 | 1/1982 | Mink et al. | 252/429 B |
| 4,328,122 | 5/1982 | Monte et al. | 252/429 B |
| 4,364,853 | 12/1982 | Mink et al. | 252/429 B |

Primary Examiner—Patrick Garvin

Attorney, Agent, or Firm—Henry Z. Friedlander

[57] ABSTRACT

A novel catalytic system for polymerizing olefins comprises:
- (a) a cocatalytic component containing an organometallic compound of Groups I–III of the periodic table, and
- (b) a catalytic component containing titanium obtained by:
  - (i) copulverizing a substantially anhydrous magnesium compound containing halogen or manganese compound containing halogen with: a phenol, an organic polymer containing silicon, a titanium halide, and an electron-donor compound to produce a copulverized product, and
  - (ii) reacting the copulverized product with a liquid titanium compound containing halogen.

The invention also encompasses the novel catalytic component, processes for preparing the catalytic component containing titanium, and the use of the novel catalytic system for polyermizing olefins.

45 Claims, No Drawings

CATALYST FOR POLYMERIZING OLEFINS

BACKGROUND OF THE INVENTION

This invention relates to a catalytic system for polymerizing olefins, particularly propylene and comonomers. The present invention involves a novel supported catalyst containing titanium, a cocatalyst containing an organometallic compound, a process for producing the catalyst, and use of the catalytic system to polymerize olefins by the coordinate complex (Ziegler-Natta) method.

The coordinate complex approach to polymerizing olefins has been known for almost 30 years, and thousands of catalytic systems involving that approach have been disclosed. Nevertheless, the quest for higher catalytic activity coupled with higher stereospecificity of the polymer continues. The present invention realizes these twin goals.

Activity is normally measured by the grams of polyolefin produced per gram of catalyst containing titanium or other transition metal. The higher the activity is, the lower the amount of metallic ash and corrosive halide left in the polymer. If the activity is high enough, e.g., $\geq 10,000$, then the de-ashing step in processing the final polyolefin can be omitted—an important improvement.

For olefins such as propylene which can form isotactic structures, the higher the isotactic index is (up to about 97 percent), the better the physical properties of the polymer are found to be. Isotactic polypropylene is more ordered, less soluble in halocarbons or hydrocarbons, and useful for its higher strength than the more soluble atactic form. Isotactic indices of 93 or higher are favored for commercial polypropylene.

The polmerization of olefins is described in numerous patents, journal articles, and books. U.S. Pat. No. 4,069,169 discloses a component prepared by milling magnesium chloride, ethyl benzoate, and titanium tetrachloride followed by treatment with $TiCl_4$, optionally in the presence of a hydrocarbon solvent.

U.S. Pat. No. 4,143,223 discloses a similar process and product produced by milling magnesium chloride, ethyl benzoate, and phenol plus post-treatment with $TiCl_4$.

U.S. Pat. No. 4,157,435 discloses yet another process involving the copulverization of magnesium chloride, polysiloxane, and ethyl benzoate in the presence of $TiCl_4$ or a $TiCl_4$ complex followed by reaction with $TiCl_4$.

U.S. Pat. No. 4,290,915 discloses a solid titanium catalytic component comprising copulverized magnesium chloride, ethyl benzoate, and silicone oil post-treated with hot $TiCl_4$, washed with a hydrocarbon, and partially dried so that 1 to about 10 percent by weight of the component of hydrocarbon remains.

U.S. Pat. No. 3,789,036 discloses a process for preparing elastomeric, olefinic copolymers employing a catalytic system containing a component prepared by contacting an anhydrous, activated Mg, Mn, or Ca dihalide with a halogenated titanium compound. The activation is indicated by replacement of the most intense X-ray diffraction lines by a broadened peak.

All five of the disclosures cited above are incorporated by reference into this application.

OBJECT OF THE INVENTION

It is an object of this invention to prepare a coordinate complex catalytic system for polymerizing olefins, alone or as mixtures, to polymers of high stereoregularity. It is a further object of this invention to catalyse such polymerization with components of such high activity that the metallic ash content of the polymer and the halogen residues in the polymer will be low. It is an additional object of this invention to produce catalytic components of sufficient chemical and physical stability that they may be shipped for use at locations far in distance and remote in time from their place of manufacture. Other objects of the invention will be apparent to those skilled in the art.

SUMMARY OF THE INVENTION

Surprisingly, both high catalytic activity and high isotatic index (II) can be achieved by employing the novel catalyst of the present invention for polymerizing olefins, especially propylene. The novel catalytic system comprises:

(a) a component containing an organometallic compound of metals from Groups I–III of the periodic table, and (b) a component containing titanium halide obtained by:
   (i) copulverizing a substantially anhydrous magnesium compound containing halogen or manganese compound containing halogen with: a phenol, an organic polymer containing silicon, a titanium halide, and an electron-donor compound to produce a copulverized product, and
   (ii) reacting the copulverized product with a liquid titanium compound containing halogen.

An aspect of the present invention is a novel component containing titanium halide and a process for producing the novel component.

Another aspect of the present invention is a process for employing the novel catalytic system to polymerize propylene, ethylene, their mixtures, other olefins, or mixtures of olefins.

DETAILED DESCRIPTION OF THE INVENTION

The present invention is broadly applicable to the polymerization of monomeric olefins including 1-olefins such as ethylene and propylene, dienes, especially conjugated dienes such as butadiene, and those other olefins which are only polymerized with difficulty, such as 2-butene. The preferred monomeric olefins are those corresponding to the formula $R-CH=CH_2$, wherein R is an alkyl radical containing up to 12 carbon atoms inclusive and hydrogen. Among the preferred monomeric olefins are ethylene, propylene, 1-butene, 1,4-butadiene, 1-pentene, 4-methyl-1 pentene, 1-hexene, and the like. These monomers may be employed individually or in comonomeric mixtures such as ethylene/propylene, ethylene/propylene/butadiene, and the like. The term "monomeric olefin" means those olefins which can undergo addition polymerization alone or with comonomers.

Although for illustrating the present invention, the polymerization of propylene is described herein as an example, the invention is by no means limited to any one monomeric olefin.

The organometallic compound for component (a), the cocatalyst, may be an organometallic compound known to those skilled in the art of coordinate complex polymerization as useful. Included are organocompounds of zinc, mercury, magnesium, cadmium, boron, gallium and other metals of Groups IA, IIA, and IIIA of the periodic table of the elements. The preferred organometallic compounds are those of aluminum, especially trialkylaluminums.

The organoaluminum compound preferred for use as a cocatalyst may be selected from the following compounds:

trialkyl aluminums such as triethylaluminum, triisobutylaluminum, and trihexylaluminum, dialkyl aluminum halides such as diethylaluminum chloride, diethylaluminum bromide, and dibutylaluminum chloride; alkylaluminum sesquihalides such as ethylaluminum sesquichloride, alkylaluminum dihalides such as ethylaluminum dichloride, ethylaluminum difluoride, and butylaluminum dichloride, and dialkylaluminum alkoxides such as diethylaluminum ethoxide, diethylaluminum butoxide, and diethylaluminum phenoxide.

The molar ratio of trialkyl aluminum or other cocatalyst to the novel catalyst of the present invention may range from about 1000:1 to about 1:1, preferably about 200:1 to about 10:1.

An electron donor may be employed in the cocatalyst component with the organometallic compound. Electron donors (Lewis bases) are organic compounds containing O, N, S, or P moities which share electronpairs with the cocatalyst (Lewis acid) and do not interfere with the polymerization. Oxygen compounds are preferred donors especially alkyl esters of aromatic carboxylic esters. Methyl toluate, ethyl anisate, ethyl benzoate, and dibutyl phthalate, are examples of such preferred electron donors (Lewis bases) for the cocatalyst component.

The electron donor employed in conjunction with the cocatalyst may be advantageously used in a molar ratio from about 1:15 to about 1:1 with respect to the cocatalyst (e.g., trialkylaluminum).

The novel supported catalyst component containing titanium of the instant invention is prepared by activation, preferably by copulverization of the support with specified electron donors. These donors (Lewis bases) differ from those of the cocatalyst. Activation can be carried out by dissolving the support and its electron donors followed by reprecipitation. Also a finely divided support can be generated in situ by chemical reaction, such as the reaction of a Grignard reagent with HCl in a hydrocarbon to yield a magnesium halide in finely divided form. The much preferred means for activation, however, is copulverization (milling, grinding) of the support with the electron donors of the catalyst component in any sequence or combination.

The copulverization may be carried out in any suitable milling equipment such as a ball mill, a hammer mill, a vibratory mill, a grinding mill, or the like. The purpose of the copulverization is to bring the reagents into more intimate contact than the usual mixing step, which is intended only to create physical homogenity. Use of a ball mill is preferred, especially employing stainless steel balls, but ceramic, glass, or balls of other material may be used.

The first step (i) in obtaining component (b) containing a titanium halide is copulverization of a magnesium compound or a magnanese compound or a mixture thereof containing halogen as a support with one or more of the three electron donors required to practice the present invention.

The preferred support for practicing the instant invention is anhydrous magnesium dichloride, but other support materials may be selected from magnesium hydroxychloride (MgOHCl), magnesium alkoxychloride, magnesium bromide, magnesium hydroxybromide, magnesium alkoxybromide, manganese chloride, manganese bromide, manganese hydroxychloride, and manganese alkoxyhalide. Magnesium phenoxy halide and magnesium substituted phenoxy halides may also be used. Preferred substituents in the phenoxy moiety are alkyl groups containing 1 to 5 carbon atoms, halogen groups such as chloride or bromine, and the nitro group. As in chloro-substituted phenoxy magnesium compounds, the magnesium or manganese compound containing halogen need not have the halogen atom directly bonded to the magnesium or manganese atom.

The support, chosen from the halogenated materials cited above, may also be partially converted to alcoholate or carbonate groups. Furthermore, the support may contain diluents, up to about 70 percent, of inert, powdered material such as inorganic carbonates, sulfates, borates, or oxides. Examples of such diluents are dry $NaCl$, $KCl$, $LiCl$, $CaCO_3$, $BaCO_3$, $Na_2SO_4$, $K_2SO_2$, $NaCO_3$, $K_2CO_3$, $Na_2B_4O_7$, $CaSO_4$, $B_2O_3$, $Al_2O_3$, $SiO_2$, $TiO_2$ and the like.

An important aspect of the present invention is that three different electron donors for the catalyst component be employed: a general donor (vide infra), a phenol, and an organic polymer containing silicon. The order of addition of these three in the copulverization process of step (i) is not critical.

Preferably the magnesium or manganese compound containing halogen, which is to serve as the support, is dried optionally under vacuum at an elevated temperature before milling. The preferred elevated temperature of drying is over 100° C.; over 150° C. is more preferred. The drying time can be from one or more hours up to several days depending on the capacity of the drier, the amount of adventitious water present, and the elevated temperature. A reasonable duration of drying for commercial magnesium chloride containing 2–3 percent moisture is 5–25 hours, at about 180° C., under a vacuum of less than 5 torr.

It is also preferable to premill (prepulverize) the support material after drying and before the addition of any electron-donors, but this is not essential to the practice of the present invention. Premilling serves to increase the surface area of the support material and develop fresh sites for interaction with the electron-donors. A suitable premilling time is from one quarter to ten days. The amount and size of the balls used for pulverization can vary within wide ranges. The weight of the balls compared to the weight of the support material charged to the mill will vary depending on the density of the balls. A suitable range would be about equal weight for ceramic and glass balls to about 50 times the weight of the charge for stainless steel balls. The size of the balls can vary preferably from about 3 mm to about 50 mm.

After drying and premilling, one or more of the electron-donors of the present invention may be added separately or together in any order or combination. It is advantageous to add the organic polymer containing silicon first, as it may serve as a pulverization aid as well as a donor. The preferred polymer containing silicon is a linear polysiloxane, commercially known as silicone oil, with the chemical formula

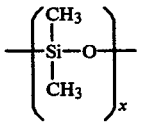

The molecular weight of silicone oils advantageously used in this invention can range from about 300 to about 150,000. The amount of silicone oil (polysiloxane) employed can range from about five percent of the weight of the support material to about 30 percent of the weight of the support. About 10–20 percent by weight of the support material is a preferred amount of polysiloxane or other organic polymer containing silicon.

The second electron donor employed in the present invention is a phenol or naphthol. The phenol or napthhol may be substituted with alkyl, halogen, nitro or other inert moieties not interfering with the eventual polymerization. Di- or tri-phenols such as catechol or resorcinol with or without inert substituents may be employed. The phenol or naphthol may contain from 6 to 24 carbon atoms. Solid phenolic donors are especially favored for copulverization. Phenol, itself, $C_6H_5OH$, is the preferred phenol. The phenol may be added before, with, or after the addition of the other electron-donors. The amount of phenol employed may range from about 5 to about 150 weight percent of the support material. The phenolic electron-donor may be added to the charge being copulverized before, with, or after the polysiloxane electron-donor/pulverization aid.

The third electron-donor of the present invention is a compound, preferably organic, containing oxygen, phosphorus, nitrogen, or sulfur. An inorganic compound containing O, P, N, or S atoms could be employed, however. Often these electron donors are termed Lewis bases, since the support materials containing halogen atoms are weak Lewis acids.

Among the classes of compounds containing oxygen suitable for furnishing electron-donors are: aliphatic and aromatic ethers, aliphatic carboxylic esters, aromatic carboxylic esters, cyclic esters of carbonic acid, alcohols, aldehydes, ketones, aliphatic and aromatic carboxylic acids, lactones, and carboxylic acyl halides.

Among the classes of compounds containing nitrogen suitable for furnishing electron-donors are: aliphatic amines and polyamines, aromatic amines, heterocyclic amines, nitriles, carbamates, aromatic isocyanates, and aromatic azo compounds. Electron-donors containing both oxygen and nitrogen atoms may be used such as aliphatic and aromatic amides, nitrocompounds, or guanidine and its alkyl-substituted derivatives.

Other classes of electron-donors include phosphines, phosphoroamides, sulfides, mercaptans, thioethers, thioesters, organosilicon isocyanates, and polysilazines.

Examples of electron-donor compounds from some of the classes listed above are: ethyl benzoate, ethyl anisate, ethyl toluate, ethyl acetate, diethyl carbonate, γ-butyrolactone, acetone, acetophenone, nitrobenzene, veratrol, tetramethylenediamine, dimethyl acetamide, methyl carbamate, toluene diisocyanate, benzonitrile, N-methyl pyrrolidone, and thiophenol. Especially preferred among these electron-donors is ethyl benzoate.

The amount of this third electron-donor can range from about five percent of the weight of the support material to about equal the weight of the support material. Thus, the ratio between the three electron donors can vary greatly from about 1:10:10 to about 1:0.3:0.3 for polysiloxane:phenol:general donor.

Often it is convenient to add the third donor, such as ethyl benzoate, in the form of its complex with a transition metal halide (Lewis acid). The preferred Lewis acid for complex formation is liquid $TiCl_4$, since step (ii) for preparation of the catalyst of this invention is reaction with the same $TiCl_4$. Any of the four crystalline forms of $TiCl_3$ may also be employed. The complexes formed between the preferred aromatic carboxylic esters and the preferred $TiCl_4$ are solids and hence easily copulverizable. Often they are highly colored. The duration of the milling of the support material with the three different types of electron donor (polysiloxane, phenolic compound, conventional donor or its complex) can vary from about one hour to about 20 days. Preferably the silicon-containing polymer and the phenolic compound are added first and milled with the support for at least several hours, and then the ester-$TiCl_4$ complex is added to the charge and milled for an additional period. The exact order of addition of the donors and the exact length of time each is milled is not critical to carrying out the preparation of the catalyst.

Optionally, especially when using small mills, less than 20 liters in capacity, one can interrupt the copulverization to scrape off milled material stuck to the walls of the apparatus. Also, optionally, one can sieve the premilled support or the partically copulverized material between milling steps if one halts the copulverization between the addition of the different electron donors. For selecting the desirable fraction of premilled, dried support material, a stainless steel U.S. Sieve No. 30 is preferred. For screening the copulverized product of step (i), if desired, a stainless steel U.S. Sieve No. 140 is preferred.

It is advantageous to perform premilling and copulverization operations in an inert atmosphere in order to minimize the effects of water and oxygen on the catalyst. Nitrogen, argon, helium or other inert gases may be employed. The catalyst should always be handled and stored in an inert atmosphere.

The second step (ii) in the process for preparing the novel catalyst of this invention is reacting the copulverized magnesium or manganese support material containing halogen, which has been activated in the presence of the three different, requisite electron-donors, with a source of tetravalent titanium ion. Titanium tetrachloride is preferred but titanium tetrabromide, a mixed halogen, or a mixed alkoxy halogenide may be employed, as long as it is tetravalent.

The reaction may be carried out in a liquid titanium tetravalent halogenide neat, or moderated by the presence of an alkane or aromatic hydrocarbon, halocarbon, or other non-interfering solvents. Examples of the latter are benzonitrile, ethyl acetate, or diphenyl ether, but toluene is preferred. Chlorobenzene may also be employed. One advantage derived from the use of solvents along with the titanium halide reagent is solution of any interfering side-products such as titanium phenoxyhalides, which might form from reaction with the electron donors. In an unexplained way interaction of the support material with the three electron donors of the present invention improves the properties of the titanium catalyst, as shown in the Comparative Examples.

The temperature of the reaction can range from about 60° C. to the boiling point of the titanium tetrahalide or titanium alkoxyhalide; e.g., $TiCl_4$ 136° C., $TiBr_4$ 230° C. A temperature range from about 0° to about 120° C. is preferred, whether or not a solvent is employed. Lower temperatures of reaction can be compensated for by longer reaction times. For the preferred temperature of 80°–120° C., a reaction time of about two to about five hours is preferred. If the preferred $TiCl_4$ is employed neat at its boiling point, then one to two hours suffices. In the range of about 80° to about 90° C., about two to three hours of reaction time is favored.

The preferred weight of $TiCl_4$ or other tetravalent titanium halide employed for the post-copulverization reaction should approximate the weight of the copulverized, intermediate solid to be treated. The amount of tetravalent transition metal halide may vary from 0.5 to 500 the weight of solid being treated. When a solvent is employed, its weight can range from about one-half to about ten times that of the titanium tetravalent halide reagent being used.

After the reaction step (ii) is completed, the catalytic product should be separated in an inert atmosphere from the reaction mixture by any suitable method such as decantation, filtration, cycloning, or centrifugation and washed with an inert solvent, such as a hydrocarbon, until the washings are free of halogen. The washed precipitate may then be vacuum-dried, sieved, and stored in an inert atmosphere.

The novel component containing titanium is air and moisture sensitive. Thus during preparation, storage, and use it should be kept in an inert atmosphere (e.g., nitrogen, argon) containing less than 5 ppm oxygen and less than 5 ppm moisture. The preferred cocatalysts methyl toluate or ethyl anisate are hydroscopic and should also be handled in a moisture-free environment. All reagents should be of polymerization grade.

The description of the present invention is illustrated but not limited by the following Examples, which may be varied in numerous secondary ways, while still remaining within the scope of this disclosure.

EXAMPLE 1

This Example illustrates preparation of the titanium tetrachloride ethyl benzoate complex used in the preparation of the catalyst of the present invention. The use of this complex is preferred but not required.

A 3-liter (L) three-necked flask was equipped with a gas inlet valve, a mechanical stirrer to drive a Teflon paddle, and a 250-ml pressure equalizing dropping funnel. To this flask was added 1.5 L heptane (Phillips 99.9%) and 190 ml (1.73 mol) distilled $TiCl_4$ under rapid stirring followed by the slow addition of 245 ml (1.72 mol) ethyl benzoate (Aldrich 99+%) during a one-hour period. A yellow precipitate of the complex formed immediately. The mixture was stirred for two hours at ambient conditions. After transfer of the flask to a Vacuum Atmospheres Co. glove box under nitrogen, the mixture was filtered, washed with two liters heptane, and vacuum dried for about 17 hours. The yield approached theoretical.

EXAMPLE 2

This Example illustrates preparation of the copulverized component containing titanium of the present invention.

Into a 7-L (Paul Abbe) jar mill was placed 500 g. $MgCl_2$ vacuum-dried under heat containing about 1 percent water and 8.0 kg of 1.6 cm diameter (⅝-inch) stainless steel balls. This charge was milled for five days at about 50 rpm. The activated powder was separated from the milling balls by means of a No. 30 sieve.

The 8.0 kg of stainless steel balls, 1.6 cm diameter and 250 g (2.62 mol) of activated $MgCl_2$ were recharged into the same mill along with 255 g phenol (2.71 mol) and 37.5 ml 96–100 millipoise silicone oil (General Electric Co. SF 96–100). Milling at about 50 rpm was carried out for another five days. Then 132 g of the $TiCl_4$ ethyl benzoate complex of Example 1 was added to the charge and the new mixture milled for yet another five days (total 15 days). The orange-red product was then sieved thru a No. 30 screen to separate the product from the milling balls and then thru a No. 140 sieve. The yield was 540 g.

Inside a glove box under nitrogen, a 212-g aliquot of the milled product was charged into a 2-L, three-necked flask equipped with a 250-ml pressure equalizing dropping funnel, gas-inlet valve, and stirrer made of TEFLON fluoroelastomer. With stirring, under nitrogen, 625 ml toluene was transferred into the reaction flask by a meter-long cannula followed by the addition of 375 ml (3.41 mol) $TiCl_4$ also by meter-long cannula. The reaction mixture was stirred at about 100 rpm as the flask was slowly heated to 90° C. by an oil bath. After temperature equilibration for about one hour, the reaction was continued at about 90° C. for an additional three hours. The reaction flask was then cooled to ambient conditions over 45 minutes during which the solid phase settled, whereupon the supernatant liquid was removed by cannula. Then 1 L toluene was added with mild stirring, about 40 rpm, to wash the solid for ten minutes. After a settling time of a half-hour, the supernatant liquid was again removed by cannula. The washing was repeated once more with toluene and five times more with heptane (all washes 1-L). The washings were followed by transfer of the orange slurry to a 1-L, three-neck flask with additional heptane. The supernatant was removed by cannula, the heptane evaporated under vacuum. After sieving through a No. 140 screen, the yield from this $TiCl_4$ extraction process was 92 g of orange/brown powder.

EXAMPLE 3

This Example illustrates the bulk polymerization of an olefin (propylene) employing the novel catalyst of this invention.

Into a 2.3-L stirred reactor equipped with a heater, means for temperature control, and gas inlet and outlet lines were added, in order, 9 mmole triethylaluminum, 0.54 g methyl p-toluate, 30 mg of the novel catalyst prepared in Example 2, and 5 psi (⅓ atmosphere) hydrogen as a polymerization moderator. The reactor was stirred at 400 rpm and held at 70° C. Then monomer-grade propylene was introduced and maintained at 32 atmospheres for 1.5 hours, whereupon the polymerization was stopped by venting the gases and pouring the contents of the reactor into alcohol. The solid product was filtered from the reaction mixture, washed with heptane, and vacuum-dried.

The result of the bulk polymerization was 16,000 g polypropylene/g titanium component with an isotactic index (II) of 94.5. The polymer contained about 2 ppm Ti and had a bulk density of about 0.45 g/ml. The size distribution of the polymer had the following weight percent less than the number of microns indicated:

| Polypropylene particle diameter | 45μ | 180μ | 425μ | 850μ | 1700μ |
| --- | --- | --- | --- | --- | --- |

| Wg. % less | 4 | 23 | 57 | 78 | 90 |
|---|---|---|---|---|---|

EXAMPLE 4

This Example illustrates the slurry polymerization of an olefin (propylene) in a solvent (heptane) employing the novel catalyst of this invention.

In a manner similar to the procedure of Example 3, a 4.5 L reactor containing 2 L heptane stirred at 600 rpm was used to carry out a polymerization for 1.5 hours at 65° C. with the reactants added in the following order: 12 mmole triethylaluminum, 0.54 g methyl p-toluate, 100 mg catalyst component of Example 2, 3.2 psi (about 1/5 atmosphere) hydrogen moderator, and propylene maintained at 10 atm pressure.

After 1.5 hr. the reaction was quenched and the product was washed, and vacuum-dried. The catalyst component showed an activity of 9,000 g polymer/g catalyst component, II 89. The bulk density, catalyst residue, and size distribution were the same as in Example 3.

Catalytic activity is calculated as:

$$\frac{\text{dried polymer plus heptane-soluble polymer}}{\text{titanium component}}$$

Isotactic Index (II) is calculated as: the fraction of total polymer insoluble in boiling heptane for three hours (termed $C_7$) multiplied by the amount of dried, isolated polymer, multiplied by 100 and divided by total polymer produced, that is:

$$II = \frac{C_7 \times \text{dry polymer}}{\text{total polymer}} \times 100$$

EXAMPLES 5-34

These Examples illustrate the stability of the novel titanium catalyst of the present invention as prepared in Example 2. By the slurry method of Example 4, with hydrogen moderator, polymerizations were repeated weekly over a seven-month period with the same sample. The results as to catalytic activity and stereospecificity, measured by Isotactic Index, are shown below. This sample was over six months old when the testing started.

| Example No. | Week No. | Activity g/g and II |
|---|---|---|
| 5 | 29 | 8039/88.2 |
| 6 | 30 | 8046/89.1 |
| 7 | 31 | 7299/88.8 |
| 8 | 32 | 6348/91.8 |
| 9 | 33 | 7289/88.0 |
| 10 | 34 | 9203/84.4 |
| 11 | 35 | 8493/84.8 |
| 12 | 36 | 7347/90.6 |
| 13 | 37 | 8237/89.0 |
| 14 | 38 | 8365/88.7 |
| 15 | 39 | 7669/90.0 |
| 16 | 40 | 8094/91.1 |
| 17 | 41 | 5981/86.2 |
| 18 | 41 (next day) | 6856/86.5 |
| 19 | 42 | 6778/88.5 |
| 20 | 44 | 7163/88.5 |
| 21 | 45 | 6981/90.0 |
| 22 | 46 | 8251/88.4 |
| 23 | 47 | 6273/88.7 |
| 24 | 48 | 7941/89.2 |
| 25 | 49 | 6637/89.2 |
| 26 | 50 | 7287/89.0 |
| 27 | 51 | 6907/88.9 |
| 28 | 51 (after 3 days) | 6887/89.2 |
| 29 | 52 | 5120/90.9 |
| 30 | 53 | 6613/88.7 |
| 31 | 54 | 7297/90.9 |
| 32 | 55 | 6336/89.2 |
| 33 | 56 | 7847/88.5 |
| 34 | 61 | 8392/89.1 |

EXAMPLES 35-40

This set of Examples illustrate the results of the slurry polymerization procedure of Example 4 using six different preparations of the novel titanium catalyst of this invention, prepared by the procedure of Examples 1 and 2. In all cases the triethylaluminum cocatalyst/electron donor ratio (usually methyl p-toluate) was 12 mmol:3 mmol. As indicated in some runs the hydrogen moderator at 3.2 psi (1/5 atm) was not employed. In some runs the polymerization time was three hours rather than the standard 1.5 hours. Activity in g polymer/g catalyst and Isotactic Index are shown. In conjunction with the elemental analyses of Example 41 and the bulk polymerization data of Examples 43, 44 and 45 it is seen that reliably active and stereospecific catalysts can be made by the present invention and that catalytic activity and stereospecificity of the product do not depend on the use of a hydrogen moderator, the use of two cocatalyst electron-donors or on the activity in bulk polymerization.

| Example | Hydrogen (3.2 psi) | Time (hr.) | Activity g/g/II |
|---|---|---|---|
| 35 | no | 1.5 | 7481/92.4 |
|  | no | 1.5 | 7193/92.5 |
|  | yes | 1.5 | 6927/91.5 |
|  | yes | 1.5 | 6558/86.5 |
| 36 | no | 1.5 | 7040/88.6 |
| 37 | yes | 1.5 | 7181/92.6 |
|  | yes | 1.5 | 7908/90.8 |
|  | yes | 1.5 | 7544/91.7 |
| 38 | yes | 1.5 | 8108/91.1 |
|  | yes | 1.5 | 7503/91.5 |
|  | yes | 1.5 | 7805/91.3 |
|  | yes | 3.0 | 13,416/89.4 |
|  | yes | 3.0 | 14,363/89.6 |
|  | yes | 3.0 | 13,889/89.5 |
| 39 | yes | 1.5 | 10,608/92.7 |
|  | yes | 1.5 | 11,543/91.8 |
| 40 | yes* | 1.5 | 9461/89.5 |
|  | yes* | 1.5 | 9231/88.9 |
|  | yes | 1.5 | 8656/90.7 |
|  | yes | 1.5 | 8002/92.4 |

*ethyl anisate donor

EXAMPLE 41

The elemental analyses of six separate preparations of the novel titanium catalyst of the present invention made employing the method of Examples 1 and 2 are given below. They show, in conjunction with Examples 35-40 that within the compositional range of the present invention, reproducibly active catalyst components are made independent of the titanium content, the chloride content, or amount of residual organic electron donor, shown by % C.

| Sample | Slurry Polyz't'n. Example | % Ti | % Cl | % Mg | % C | % H | % Si |
|---|---|---|---|---|---|---|---|
| 41-a | 35 | 3.9 | 59.3 | 20.1 | 13.65 | 1.63 | — |
| 41-b | 36 | 2.55 | 55.9 | 16.8 | 15.37 | 1.90 | <0.1 |
| 41-c | 37 | 2.39 | 60.5 | 21.6 | 11.02 | 1.39 | <0.1 |
| 41-d | 38 | 4.04 | 51.1 | 16.6 | 16.37 | 2.27 | <0.3 |
| 41-e | 39 | 3.38 | 56.0 | 17.8 | 15.42 | 1.74 | <0.2 |
| 41-f | 40 | 3.05 | 61.6 | 16.3 | — | — | <0.1 |

EXAMPLE 42

This Example modifies the present invention with the variations that in the copulverizatin a zirconium tetrachloride.ethyl benzoate complex is substituted for TiCl$_4$.EthBz and phenol was omitted. The post-treatment extraction step was carried out with liquid TiCl$_4$. In other respects the procedures of Examples 1, 2, and 4 were employed. The modified catalyst containing both Zi and Ti in the slurry polymerization of Example 4 gave a polymer characterized by 3930 g. polypropylene/g catalyst with an II of 85.4.

EXAMPLES 43-44-45

These Examples illustrate the reproducibility and use of the novel catalyst component of the present invention when characterized by bulk polymerization, as in Example 3.

Three samples of the titanium catalyst component were prepared separately as in Examples 1 and 2. Bulk polymerizations were carried out separately, as in Example 3, with the results shown below. The results show that within the range of the composition of the present invention the bulk polymerization characteristics do not depend on the elemental analysis of the component or the slurry polymerization characterization.

| Example | Activity g/g/II | Remarks |
|---|---|---|
| 43 | 16,023/96.6 | cf. Expls. 38, 41-d |
|  | 14,961/95.3 |  |
|  | 16,895/94.7 |  |
| 44 | 15,426/94.4 | cf. Expls. 39, 41-e |
|  | 14,159/95.7 |  |
|  | 14,140/95.7 |  |
|  | 15,163/97.8 |  |
|  | 16,049/94.3 |  |
| 45 | 20,370/94.4 | cf. Expls. 40, 41-f |
|  | 19,280/94.6 |  |
|  | 21,756/93.5 |  |
|  | 17,906/93.7 |  |
|  | 17,977/94.7 |  |

EXAMPLES 46-67

This set of Examples illustrates the effect of variations in the milling times for the three milling periods of the procedure of Examples 1 and 2, as well as the effect of variations in the ratios of the three electron-donors of Examples 1 and 2, namely TiCl$_4$.EthBz complex, silicone oil, and phenol. After preparation in the various regimes, slurry polymerizations were run as in Example 4. The results are tabulated below.

These results show that, in comparison with the more laborious regime of Example 2, highly active, stereospecific catalysts of the present invention can be prepared with about half the prior milling time, one-quarter the amount of phenol, one-half the amount of silicone oil, or one-half the amount of ethyl benzoate.TiCl$_4$ comlex. It is also seen that the individual milling steps of Examples 1 and 2 may be omitted so that two or three of the donors may be milled in during one milling step. These studies led to the process of Example 71.

EXAMPLES 46-67

| Ex. | MgCl$_2$ (g) | First Milling (days) | Phenol (g) | Silicone oil (g) | 2nd Milling (days) | TiCl$_4$.EthBz (g) | Third Milling (days) | Slurry |
|---|---|---|---|---|---|---|---|---|
| 46a | 28 | 5 | 28.6 | 4.2 | 5 | 14 | 5 | 9588/88.4 |
|  |  |  |  |  |  |  |  | 9937/88.0 |
| 46b | 28 | 5 | 28.6 | 4.2 | 5 | 14 | 5 | 10328/89.3 |
|  |  |  |  |  |  |  |  | 10551/89.9 |
| 46c | 28 | 5 | 28.6 | 4.2 | 5 | 14 | 5 | 10891/89.7 |
|  |  |  |  |  |  |  |  | 10947/89.8 |
| 46d | 28 | 5 | 28.6 | 4.2 | 5 | 14 | 5 | 10179/90.0 |
| 47 | 10 | 5 | 10 | 1.5 | 5 | 5 | 2 | 7804/90.3 |
|  |  |  |  |  |  |  |  | 9428/89.1 |
|  |  |  |  |  |  |  |  | 7186/87.7 |
| 48 | 12 | 5 | 6 | 1.3 | 2 | 2.2 | 2 | 8714/88.4 |
|  |  |  |  |  |  |  |  | 8269/88.2 |
| 49 | 12 | 5 | 6 | 1.3 | 5 | 2.2 | 2 | 8255/88.4 |
| 50 | 12 | 5 | 6 | 1.3 | 2 | 4.4 | 5 | 7515/88.0 |
|  |  |  |  |  |  |  |  | 6050/91.7 |
| 51 | 10 | 2 | 10 | 1.5 | 3.5 | 2.5 | 3.5 | 9173/89.7 |
|  |  |  |  |  |  |  |  | 9165/88.9 |
| 52 | 28 | 5 | 7 | 4.2 | 5 | 7 | 5 | 4914/92.3 |
|  |  |  |  |  |  |  |  | 3868/88.7 |
| 53 | 28 | 5 | 7 | 4.2 | 0 | 7 | 5 | 4828/89.5 |
|  |  |  |  |  |  |  |  | 4558/90.9 |
| 54 | 28 | 5 | 7 | 2.1 | 5 | 7 | 4 | 7286/89.4 |
|  |  |  |  |  |  |  |  | 7570/89.1 |
| 55 | 28 | 0 | 14 | 2.1 | 5 | 7 | 3 | 7789/90.5 |
| 56 | 28 | 0 | 7 | 4.2 | 5 | 7 | 3 | 8454/86.5 |
| 57 | 28 | 5 | 7 | 4.2 | 2 | 7 | 3 | 7817/— |
| 58 | 28 | 5 | 14 | 2.1 | 2 | 7 | 3 | 7743/90.8 |
| 59 | 28 | 5 | 7 | 4.2 | 2 | 7 | 3 | 7817/87.5 |
| 60 | 28 | 0 | 14 | 2.1 | 5 | 7 | 3 | 7789/90.5 |
| 61 | 28 | 0 | 7 | 4.2 | 5 | 7 | 3 | 8454/86.5 |

-continued

| Ex. | MgCl₂ (g) | First Milling (days) | Phenol (g) | Silicone oil (g) | 2nd Milling (days) | TiCl₄. Eth Bz (g) | Third Milling (days) | Slurry |
|---|---|---|---|---|---|---|---|---|
| 62 | 28 | 5 | 21 | 4.2 | 4 | 7 | 3 | 8990/89.8 |
|    |    |   |    |     |   |   |   | 9142/86.5 |
| 63 | 28 | 5 | 14 | 4.2 | 4 | 7 | 3 | 8894/89.4 |
|    |    |   |    |     |   |   |   | 9352/88.7 |
| 64 | 28 | 5 | 14 | 2.1 | 4 | 14 | 3 | 9037/91.1 |
|    |    |   |    |     |   |   |   | 8518/91.9 |
| 65 | 28 | 5 | 28.6 | 4.2 | 4 | 7 | 3 | 8326/90.2 |
|    |    |   |    |     |   |   |   | 7070/90.5 |
| 66 | 28 | 5 | 28.6 | 2.1 | 4 | 7 | 3 | 7501/86.8 |
| 67 | 10 | 2 | 10 | 1.5 | 3.5 | 2.5 | 3.5 | 8208/89.9 |
|    |    |   |    |     |   |   |   | 8570/90.4 |

EXAMPLE 68

This Example illustrates the possibilities in varying the milling modes from the regime of Example 2. All the reagents and relative amounts of reagents were the same as in Example 2; only the order of addition and extent of milling was varied.

In 68a and MgCl₂ was premilled for five days, then all three organic electron donors were added at the same time (TiCl₄.EthBz, phenol, silicone oil), the mixture milled for 10 more days, and the copulverizate extracted with 2:3 TiCl₄/toluene as in Example 2.

In 68b the procedure was the same as in 68a except that the second milling was for 15 days to make a total of 20 days including the premilling before TiCl₄/toluene extraction.

In 68c the MgCl₂ was not milled, merely oven dried. All the organic electron donors were added at the beginning and the total mixture milled five days before extraction.

In 68d there was a slight chemical variation in that the simplified regime of 68c was followed but liquid ethyl benzoate was used in the same molar amount instead of the solid ethyl benzoate.TiCl₄ complex of Example 1.

Upon standard slurry polymerization of propylene, as in Example 4, the catalytic activity (g/g) and II were as follows:

| Example | Activity (gPP/g cat) II |
|---|---|
| 68a | 10,409/89.2 |
| 68b | 9,788/91.4 |
| 68c | 10,357/90.2 |
| 68d | 10,306/89.4 |

EXAMPLE 69

This Example illustrates the effect of varying the time and temperature for the post-treatment/extraction step with TiCl₄/toluene described in Example 2. All the relative amounts of MgCl₂, phenol, TiCl₄.EthBz complex, and silicone oil were the same as in Example 2. The milling was done in three, 5-day steps, as described in Example 2. For each variant 10 g. of modified MgCl₂ copulverizate was treated with 20 ml TiCl₄ in 30 ml toluene, as in Example 2. The times and temperatures were varied as shown below and the component washed, filtered, vacuum-dried, and tested with the slurry polymerization of propylene, as described in Example 4 with the following results.

| Example | Heating Temp. °C./Time, hr. | | Catalytic Activity g/g/II |
|---|---|---|---|
| 69a | 100 | 2 | 10,440/89.6 |
| 69b | 100 | 3 | 9577/90.6 |
| 69c | 80 | 2 | 7698/91.7 |
| 69d | 60 | 3 | 5944/87.5 |

It is seen that the activity of the catalyst does not depend directly on the length of the post-treatment step, and that temperatures lower than 100° C. can be used for the post-treatment step.

EXAMPLE 70

This Example illustrates the effect of varying the amount and ratio of the TiCl₄/toluene reagent employed in the post-treatment/extraction step of Example 2. Some variation was also carried out in the amount (and hence ratio) of some of the three, organic electron-donors added in the copulverization regime and in the duration of the three ball-milling steps as indicated below.

As in Example 69 the amounts of MgCl₂, phenol, TiCl₄.EthBz complex, and silicone oil of Example 2 were employed, except where indicated. Also, except where indicated the three, 5-day ball milling sequences were employed for copulverization. All post-treatments in TiCl₄/toluene were carried out at 100° C. for two hours. After separation, washing, and vacuum-drying the catalytic component was evaluated by the slurry polymerization of propylene, as in Example 4, with the following results. It is seen that within the range of varying conditions indicated: the catalyst of the present invention retains its stereospecificity with less milling time, the use of less electron donor can lower catalytic activity, neither the amount of TiCl₄ nor solvent/TiCl₄ ratio necessarily affects the efficacy of the post-treatment step.

| Example | Vol (ml) Toluene/TiCl₄ per 100 g copulverizate | Catalytic Activity g/g/ Isotactic Index |
|---|---|---|
| 70a | 30/20, standard | 10,500/89.8 |
| 70b | 18/12 | 8920/86.6 |
| 70c | 22.5/7.5 | 9701/89.8 |
| 70d | 30/10 | 7966/91.4 |
| 70e* | 30/20 | 5534/93.3 |
| 70f* | 22.5/7.5 | 6991/90.2 |

*¼ phenol, ¼ TiCl₄.EthBz; 5-, 4-, 3-day ball milling sequence.

EXAMPLE 71

This Example illustrates the use of larger scale equipment to produce the novel titanium component of the present invention on the kg, rather than g, scale in a preferred method.

The equipment employed included a 120-L, glass-lined agitated, steam-jacketed reactor; a 0.6 m₂ stainless steel Fundabrand filter; a glass-lined four cubic foot tumble drier; and a one cubic foot ball mill charged with 50 kg, 1.27-cm diameter steel balls.

The tumble drier was used to reduce the water content of 10 kg $MgCl_2$ (commercial grade) from 2.5–3.0 percent to 1.5–2.0 percent moisture by heating for eight hours at 175° C. under nitrogen sweep at 0.06 atm.

The $TiCl_4.EthBz$ complex was prepared by charging 60 L heptane and 2.0 kg ethyl benzoate to the reactor. Then 2.6 kg $TiCl_4$ was slowly added with agitation to the reactor at such a rate that the temperature was maintained at 40° C. When the reaction was completed, agitation was continued for 20 minutes whereupon 60 L more heptane was added. The mixture was then filtered and dried on the filter with nitrogen, yielding about 4.5 kg $TiCl_4.EthBz$ complex.

The dried $MgCl_2$ was ball milled for 8 hr. at 30° under full cooling and then discharged.

Into the ball mill was charged 3 kg premilled MgCl, 0.5 kg silicone oil, and 3 kg. liquid phenol (at 60° C.). The ball mill was operated at full cooling for four hours. Then 1.5 kg of the $TiCl_4.EthBz$ complex was added, and the milling continued for four additional hours, whereupon the milled copulverizate was discharged (about 7 kg). The copulverization with the three, organic electron-donors was then repeated to produce enough intermediate for post-treatment/extraction.

The post-treatment was carried out by charging to the reactor 45 L toluene, 12 kg copulverizate, with the addition of 36 kg $TiCl_4$ at a slow enough rate so that the temperature was kept below 40° C. After this addition the reactor was heated to 90° C. and kept at that temperature for two hours, whereupon 80 L additional toluene was added and the solids filtered off. The filter cake was washed first with 140 L toluene and then 140 L heptane, followed by drying with a nitrogen sweep. The yield was 9 kg of the novel titanium catalyst of the present invention.

This product was tested for catalytic activity and stereospecificity by the polymerization method of Example 4 with the following results:

| Example | Catalytic Activity g/g | Isotactic Index |
| --- | --- | --- |
| 71a | 7,300 | 91.9 |
| 71b | 4,900 | 91.6 |

EXAMPLE 72

This Example illustrates the use of the novel titanium catalyst of the present invention to polymerize ethylene.

Ethylene was polymerized in a 1-L, round-bottom flask mounted on a shaker table with a 5-cm stroke shaker operating at 265 strokes per minute at 70° C. for 1.5 hours under 2 atm (30 psi) pressure using an aluminum alkyl or magnesium alkyl cocatalyst in a moisture-free, air-free system. The system is first purged with nitrogen after pre-treatment with caustic-peroxide to remove traces of transition metals followed by washing, acid rinse, washing, and drying.

The flasks heated to about 120° C. were purged with nitrogen and then cooled to 70° C., whereupon 300 ml heptane was added. Then 0.1 g titanium catalyst under inert atmosphere was transferred to the reaction vessel from a vial followed by addition of 5.6 ml of 26 percent triisobutylaluminum solution in heptane by means of a hypodermic syringe. Upon opening the supply valve to a source of monomer grade ethylene the reaction was started. After 1.5 hr at 70° C. with shaking the monomer was carefully vented thus ending the reaction. Then 500 ml isopropyl alcohol was added, the solid polymer separated, washed with 400 ml 2:1 alcohol/water mixture, and vacuum-dried. The catalytic activity was 555 g PE/g titanium catalyst.

COMPARATIVE EXAMPLE 1

This Comparative Example illustrates the comparative effectiveness of using two rather than all three, organic electron-donors employed in preparing the titanium catalytic component of the present invention.

Employing the procedures of Examples 1, 2, and 4 a control run of the present invention was made (Comp. Ex. 1A) using the $TiCl_4$/toluene reagent for the post-treatment/extraction step. Then the same procedure was employed omitting the $TiCl_4$.ethyl benzoate complex (C.E. 1B), the silicone oil (C.E. 1C), or the phenol (C.E. 1D) electron-donor.

For each of these comparative titanium components a polymerization of propylene was run in slurry form, as in Example 4, with the following results for catalytic activity and stereospecific control:

| Comparative Example | Missing e-donor | Catalytic Activity g/g | Isotactic Index |
| --- | --- | --- | --- |
| 1A | none | 10,608 | 92.7 |
| 1B | $TiCl_4.EthBz$ | 2367 | 74.1 |
| 1C | silicone oil | 8881 | 85.3 |
| 1D | phenol | 6255 | 87.7 |

COMPARATIVE EXAMPLE 2

This Comparative Example illustrates the comparative effectiveness of using two rather than all three, organic electron-donors employed in preparing the titanium catalytic component of the present invention plus employing neat $TiCl_4$ reagent without a solvent for the post-treatment/extraction step.

Employing the procedures of Comparative Example 1 save for the use of neat $TiCl_4$ without toluene, a control preparation with all three, organic electron donors was made (C.E. 2A). Then similar preparations were carried out omitting $TiCl_4.EthBz$ complex (C.E. 2B), omitting silicone oil (C.E. 2C), and omitting phenol (C.E. 2D).

For each of these comparative preparations a standard slurry polymerization of propylene was run, as in Example 4, with the following results for catalytic activity and stereospecific control (Isotactic Index):

| Comparative Example | Neat $TiCl_4$ and Missing Donor | Catalytic Activity g/g | Isotactic Index |
| --- | --- | --- | --- |
| 2A | none | 7040 | 88.6 |
| 2B | $TiCl_4$. EthBz | 1159 | 76.4 |
| 2C | silicone oil | 4425 | 83.1 |

-continued

| Comparative Example | Neat TiCl₄ and Missing Donor | Catalytic Activity g/g | Isotactic Index |
|---|---|---|---|
| 2D | phenol | 6002 | 86.8 |

I claim:

1. A catalytic system for polymerizing olefins comprising:
   (a) a component containing an organometallic compound of Groups I–III of the periodic table, and
   (b) a component containing titanium halide obtained by the steps comprising:
      (i) copulverizing a substantially anhydrous magnesium compound containing halogen or manganese compound containing halogen with: a phenol, an organic polymer containing silicon, a titanium halide, and an electron-donor compound to produce a copulverized product, and
      (ii) reacting the copulverized product with a liquid titanium compound containing halogen.

2. The catalytic system of claim 1 wherein the titanium halide and electron-donor compound of (b) (i) form a complex.

3. The catalytic system of claim 2 wherein the electron-donor compound is an aromatic carboxylic ester.

4. The catalytic system of claim 1 wherein the magnesium compound containing halogen is $MgCl_2$.

5. The catalytic system of claim 1 wherein the phenol is phenol, itself, $C_6H_5OH$.

6. The catalytic system of claim 1 wherein the organic polymer containing silicon is a polysiloxane.

7. The catalytic system of claim 1 wherein the organometallic compound is an organoaluminum compound.

8. The catalytic system of claim 7 wherein the organoaluminum compound is a trialkylaluminum.

9. The catalytic system of claim 1 wherein reaction (b) (ii) is carried out in the presence of an inert hydrocarbon or halohydrocarbon.

10. The catalytic system of claim 9 wherein the inert hydrocarbon contains a hydrocarbon selected from the group consisting of benzene, toluene, xylene, and their mixtures.

11. The catalytic system of claim 1 wherein the titanium halide of (b) (i) is titanium tetrachloride.

12. The catalytic system of claim 1 wherein the titanium compound containing halogen of (b) (ii) is titanium tetrahalide.

13. The catalytic system of claim 1 wherein reaction (b) (ii) is carried out at a temperature between about 70° C. and about 145° C.

14. The catalytic system of claim 1 wherein the copulverization step (b) (i) is carried out in two or more stages with some of the compounds present during the first stage.

15. The catalytic system of claim 1 wherein the titanium halide of (b) (i) is titanium trichloride material.

16. A component containing titanium halide of a catalytic system for polymerizing olefins obtainable by:
   (i) copulverizing a substantially anhydrous magnesium compound containing halogen or manganese compound containing halogen with: a phenol, an organic polymer containing silicon, a titanium halide, and an electron-donor compound to produce a copulverized product, and
   (ii) reacting the copulverized product with a liquid titanium compound containing halogen.

17. The component of claim 16 wherein the titanium halide and electron-donor compound form a complex.

18. The component of claim 17 wherein the electron-donor compound is an aromatic carboxylic ester.

19. The component of claim 16 wherein the magnesium compound containing halogen is $MgCl_2$.

20. The component of claim 16 wherein the phenol is phenol, itself, $C_6H_5OH$.

21. The component of claim 16 wherein the organic containing silicon is a polysiloxane.

22. The component of claim 16 wherein reaction is carried out in the presence of an inert hydrocarbon.

23. The component of claim 22 wherein the inert hydrocarbon contains a hydrocarbon selected from the group consisting of benzene, toluene, xylene, and their mixtures.

24. The component of claim 16 wherein the titanium halide is titanium tetrachloride.

25. The component of claim 16 wherein the titanium compound containing halogen is titanium tetrahalide.

26. The component of claim 16 wherein reaction is carried out at a temperature between about 70° C. and about 145° C.

27. The component of claim 16 wherein the copulverizing step is carried out in two or more stages with some of the compounds present during the first stage.

28. The component of claim 16 wherein the titanium halide is titanium trichloride material.

29. A process for producing a component containing titanium halide of a catalytic system for polymerizing olefins comprising:
   (i) copulverizing a substantially anhydrous magnexium compound containing halogen or manganese compound containing halogen with: a phenol, an organic polymer containing silicon, a titanium halide, and an electron-donor compound to produce a copulverized product, and
   (ii) reacting the copulverized product with a liquid titanium compound containing halogen.

30. The process of claim 29 wherein the titanium halide and electron-donor compound form a complex.

31. The process of claim 30 wherein the electron-donor compound is an aromatic carboxylic ester.

32. The process of claim 29 wherein the magnesium compound containing halogen is $MgCl_2$.

33. The process of claim 29 wherein the phenol is phenol, itself, $C_6H_5OH$.

34. The process of claim 29 wherein the organic polymer containing silicon is a polysiloxane.

35. The process of claim 29 wherein reaction is carried out in the presence of an inert hydrocarbon.

36. The process of claim 35 wherein the inert hydrocarbon contains a hydrocarbon selected from the group consisting of benzene, toluene, xylene, and their mixtures.

37. The process of claim 29 wherein the titanium halide is titanium tetrachloride.

38. The process of claim 29 wherein the titanium compound containing halogen is titanium tetrahalide.

39. The process of claim 29 wherein reaction is carried out at a temperature between about 70° C. and about 145° C.

40. The process of claim 29 wherein the copulverizing step is carried out in two or more stages with some of the compounds present during the first stage.

41. The process of claim 29 wherein the titanium halide is titanium trichloride material.

42. A catalytic system for polymerizing olefins comprising:
(a) a component containing an organometallic compound of Groups I–III of the periodic table, and
(b) a component containing titanium halide obtainable by:
  (i) copulverizing a substantially anhydrous magnesium compound containing halogen or manganese compound containing halogen with: a phenol, an organic polymer containing silicon, and an electron-donor compound to produce a copulverized product, and
  (ii) reacting the copulverized product with a liquid titanium compound containing halogen.

43. A component containing titanium halide of a catalytic system for polymerizing olefins obtainable by:
  (i) copulverizing a substantially anhydrous magnesium compound containing halogen or manganese compound containing halogen with: a phenol, an organic polymer containing silicon, and an electron-donor compound to produce a copulverized product, and
  (ii) reacting the copulverized product with a liquid titanium compound containing halogen.

44. A process for producing a component containing titanium halide of a catalytic system for polymerizing olefins comprising:
  (i) copulverizing a substantially anhydrous magnesium compound containing halogen or manganese compound containing halogen with: a phenol, an organic polymer containing silicon, and an electron-donor compound to produce a copulverized product, and
  (ii) reacting the copulverized product with a liquid titanium compound containing halogen.

45. The catalytic system of claim 2 wherein the electron donor is ethyl benzoate.

* * * * *

UNITED STATES PATENT AND TRADEMARK OFFICE
CERTIFICATE OF CORRECTION

PATENT NO. : 4,450,242
DATED : May 22, 1984
INVENTOR(S) : Robert I. Mink

It is certified that error appears in the above—identified patent and that said Letters Patent is hereby corrected as shown below:

Col. 2, line 2, "catalyse" should be -- catalyze --;

Col. 5, line 17, "napth-" should be -- naph- --;

Col. 6, line 28, "partically" should be -- partially --;

Col. 15, line 8, "$m_a$" should be -- $m^2$ --;

Col. 18, line 32, "magnex-" should be -- magnes- --.

Signed and Sealed this

Twenty-third Day of April 1985

[SEAL]

Attest:

DONALD J. QUIGG

Attesting Officer

Acting Commissioner of Patents and Trademarks